Jan. 25, 1966 E. J. DIEBOLD 3,231,794

THERMAL COUPLING OF PARALLEL CONNECTED SEMICONDUCTOR ELEMENTS

Filed June 5, 1961 2 Sheets-Sheet 1

INVENTOR.
EDWARD J. DIEBOLD

BY

OSTROLENK, FABER, GERB & SOFFEN

ATTORNEYS

INVENTOR.
EDWARD J. DIEBOLD
BY
OSTROLENK, FABER, GERB & SOFFEN
ATTORNEYS

United States Patent Office 3,231,794
Patented Jan. 25, 1966

3,231,794
THERMAL COUPLING OF PARALLEL CONNECTED SEMICONDUCTOR ELEMENTS

Edward J. Diebold, Palos Verdes Estates, Calif., assignor to International Rectifier Corporation, El Segundo, Calif., a corporation of California Filed June 5, 1961, Ser. No. 125,311
3 Claims. (Cl. 317—234)

My invention relates to a current balancing system for a plurality of parallel connected semiconductor rectifier elements and more specifically relates to a system for causing equal current distribution by thermally coupling the individual semiconductor elements.

In rectifier applications which require relatively high currents which exceed the current capacity of an individual element or an individual wafer within a nuitary element, it becomes necessary to connect various semiconductor elements in parallel with one another. When the characteristics of the various parallel connected elements are not identically matched, one of the elements will be found to conduct more than its proportional share of the total current to be conducted by the system. Under such conditions the increased current through such a diode will cause its operating temperature to increase, which will in turn cause additional current to be carried by this element, which in turn causes even higher temperatures and so on until the diode is destroyed.

It has been attempted to overcome this problem by very closely matching the characteristics of the individual diodes where the selection of the appropriate diode characteristics is done under static conditions. The static operation of the individual devices, however, does not always follow when the diodes are in a dynamic circuit so that the diodes are not, in fact, matched. Thus it was next attempted to provide a dynamic selection of the individual diodes by simulating final operating conditions but even this was found to fail since final actual operating temperatures were not reached in the test.

In either of these attempts it will be seen that expensive testing procedures are necessary to substantially increase the cost of the device ultimately produced.

To eliminate the necessity of matching characteristics, respective resistances have been connected in series with each of the parallel connected semiconductor elements to aid in balancing the forward voltage drop across the series connected diode and resistor. This, of course, results in additional losses in the circuit which in many applications is highly undesirable.

A further attempt to solve the current balancing problem without undesirable resistive losses has been in the use of paralleling reactors of the type set forth in my copending application Serial No. 661,871, filed May 27, 1957, now Patent No. 3,056,037, entitled "High Power Semiconductor Rectifier" and assigned to the assignee of the present invention.

While paralleling reactors adequately serve the current balancing function with the least effects upon the circuit from the standpoint of losses in current design, the current balancing reactors are expensive and heavy and are a disadvantage in this regard.

Regardless of what solution was used, great emphasis was always placed on the design of heat exchangers to remove heat from the diodes in an unrelated manner so that the diodes would run as cool as possible.

The principle of the present invention is to cause continued current balancing between parallel connected semiconductor elements by balancing the temperatures of operation of the devices as contrasted to attempting to balance the actual current conducted by the elements.

That is to say, I have recognized that the ture source of the current balancing problem is that the diodes will attempt to seek their own temperature level and that by controlling or equalizing this temperature level, I will inherently control the current level of the individual devices. In carrying out the invention, I mount individual semiconductor elements in such a manner that they are thermally coupled to one another so that they will operate at the same temperature. In a specific embodiment of the invention this thermal coupling is best obtained by connecting the semiconductor rectifier elements on a common heat sink where the individual rectifier elements are spaced from one another by a distance not greater than approximately their individual diameters while the thickness of the heat sink is approximately equal to the diameter of the individual semiconductor elements. The thickness ratio given above is preferable where the heat sink is of copper or some thermally equivalent material.

While the invention may be carried out for individual assemblies of rectifier elements mounted on a common bus conductor where the elements are spaced in the manner set forth above, the invention can be also carried out in a highly desirable manner in a device of the type set forth in copending application Serial No. 114,948 filed June 5, 1961 entitled "Large Area Rectifiers" in the name of George B. Finn, Jr., assigned to the assignee of the present invention.

As seen from that application, a unitary rectifier element of high current capacity is formed of a plurality of parallel connected individual wafers of semiconductor material rather than a single large cross sectional area wafer. In such a system the spacing of the individual wafers is preferably that given above where their spacings are no greater than the diameter of the individual wafers while the thickness of the common conductive support for each of the wafers is of the order of the diameter of the wafers.

Accordingly, a primary object of this invention is to provide a novel current balancing structure for parallel connected rectifier elements.

Another object of this invention is to thermally couple a plurality of parallel connected rectifier elements to cause a balance in their operating temperature.

Another object of this invention is to mount individual rectifier elements on a common heat sing so that the rectifier elements will operate at approximately the same temperature to maintain predetermined current characteristics.

Another object of this invention is to provide a highly economical current balancing arrangement for a plurality of parallel connected semiconductor elements.

These and other objects of this invention will be apparent from the following description when taken in connection with the drawings in which.

Figure 9:
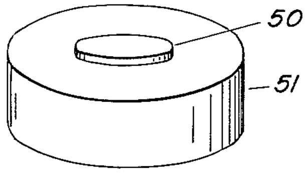

FIGURE 9 schematically illustrates a single rectifier element having a large area semiconductor wafer.

Figure 10:
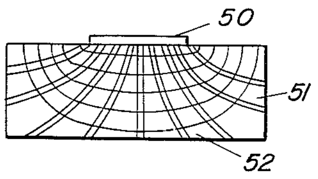

FIGURE 10 is a side cross sectional view of FIGURE 9 and illustrates the heat dispersion properties of such an element.

Figure 2:
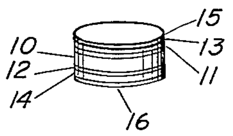
FIGURE 2 shows the wafer of FIGURE 1 after its assembly.
Figure 3:
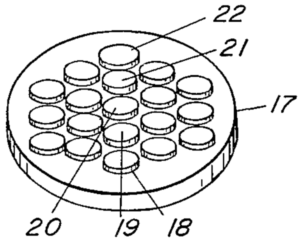
FIGURE 3 illustrates the manner in which a plurality of the individual relatively small wafers of FIGURE 2 are mounted on a common copper base of the unitary device.
Figure 11:
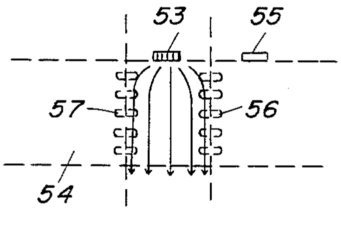

FIGURE 11 illustrates the heat dispersion properties of a relatively small area wafer of the type shown in FIGURE 2 and assembled as shown in FIGURE 3.

Figure 12:
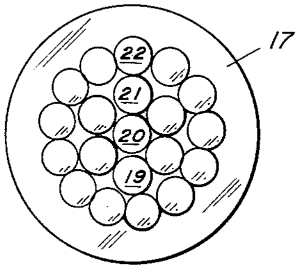

FIGURE 12 is a top view of FIGURE 3 and illustrates the preferred spacing of the various diode elements in accordance with the present invention.

Figure 7:
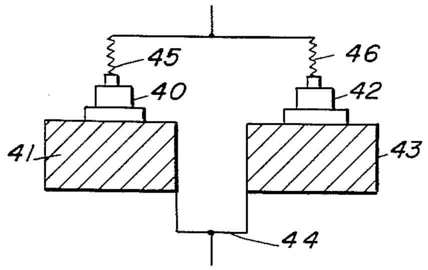
FIGURE 7 shows a typical prior art arrangement of two rectifier elements which are to be connected in parallel.

Referring first to FIGURE 7 I have illustrated therein a prior art type of arrangement wherein a first rectifier element 40 has one terminal thereof electrically connected to a heat sink 41 while a second rectifier element 42 has its lower electrode connected to a heat sink 43.

Rectifier elements 40 and 42 are of any typical available type which utilize some type of semiconductor element having a junction therein which could, for example, have a wafer of silicon or germanium material having a P–N junction. More broadly, however, I intend the present invention to extend to a device having one or more junctions as where the device has a plurality of junction for use as a transistor, a controlled rectifier, a four-layer diode and other similar multijunction devices. The wafer, of course, will be contained internally of the housings shown for devices 40 and 42 in the usual manner.

The heat sinks 41 and 43 are not necessarily thermally connected to one another but are electrically connected as by a conductor such as conductor 44. Generally, the devices are not systematically thermally related as is required by the invention.

The upper terminals of each of the devices 40 and 42 are similarly electrically connected to one another whereby devices 40 and 42 are connected in parallel. A typical manner in which current distribution between devices 40 and 42 is determined would be by placing reactor windings 45 and 46 in series with devices 40 and 42 respectively where windings 45 and 46 are wound on a common core. Such an arrangement as described in my above noted copending application Serial No. 661,871, now Patent No. 3,056,037, will force equal current distribution between the two devices. The heat sinks 41 and 43 of FIGURE 7 have been so designed as to cause minimum operating temperature for the two devices 40 and 42 respectively with their individual operating temperatures being not necessarily related to one another as indicated above.

Figure 8:
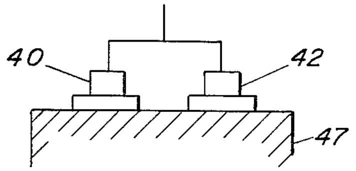
FIGURE 8 illustrates the manner in which the rectifier elements of FIGURE 7 would be connected in accordance with the present invention.

In accordance with the present invention the devices 40 and 42 as shown in FIGURE 8 are mounted on a common heat sink 47 which could, for example, be of copper, while the upper electrodes are connected together as shown to a common terminal. The thickness of heat sink 47 is in accordance with the present invention preferably substantially equal to the thickness of the semiconductor element of rectifier elements 40 and 42 while the elements 40 and 42 are preferably spaced from one another by approximately the diameter of their semiconductor element. In this manner there is a thermal coupling between the two devices which will cause their individual semiconductor elements to operate at the same temperature, to thereby define the current level at which the devices will operate.

While the above dimensions are preferred, it is possible that configurations can be formed where these dimensions should be altered. Thus, the invention should be more generally understood to require positions of the elements with respect to one another such that heat generated at the junction of rectifier 40 will be transmitted to the adjacent junction of rectifier element 42 if the temperature of the junction of rectifier element 42 is lower than that of rectifier element 40, and vice versa. It is this type of thermal coupling which the invention contemplates thereby there will be an equalization of the temperatures of the various elements, the dimensional relationships depending essentially on the thermal impedance of the structure.

The present invention is particularly applicable to cases using relatively small diameter rectifier elements. This can be understood from a consideration of FIGURES 9, 10 and 11. Referring first to FIGURES 9 and 10, I have illustrated a relatively large area wafer 50 mounted on a copper base 51. The wafer 50 may, for example, be of silicon having a P–N junction therein to serve a rectifier function. By a relatively large area I mean a wafer having a diameter of the order of 0.5 inch or more inches. In FIGURE 10 I have illustrated the manner in which heat generated in wafer 50 is dispersed through heat sink 51 where the heat dispersion is illustrated by lines 52 and points of equal heat content are indicated by lines which cross lines 52 perpendicularly. From a consideration of FIGURE 10 it can be seen that the large area junction device 50 has good thermal coupling within itself and, in fact, is somewhat better than actually needed during operation. However, its heat dispersion properties are poor since the device necessarily has a high thermal resistance due to heat flow crowding as illustrated by the closely spaced equal heat lines adjacent the upper surface of heat sink 51. This crowding of heat flow is due to the high current density and a low per unit thermal storage mass.

Where the wafer of semiconductor material is of the relatively small type shown in figure 11 (less than $\frac{3}{16}$ inch in diameter) such as wafer 53 carried on a heat sink 54 along with adjacent parallel connected wafers such as wafer 55, it will be seen that the heat flow pattern is substantially improved over that of figure 10. From the lines of heat dispersion in figure 11 it will be observed that the heat flow density decreases in the immediate vicinity of the junction. By providing an optimum spacing of the small junctions in a large heat sink, a satisfactory amount of thermal coupling and sufficient space for thermal conduction or thermal storage of surge current losses can be provided.

The thermal coupling between wafers 53 and 55, for example, is illustrated by arrows 56 while thermal coupling to a wafer (not shown) to the left of wafer 53 is illustrated by arrows 57. Thus the independent small devices, such as wafers 53 and 55 have the advantage of affording an almost unlimited heat dispersion in the immediate vicinity of the junction because of a minimum thermal resistance and a maximum thermal storage mass.

The manner in which the highly desired characteristics of a relatively small diameter wafer can be used in accordance with the present invention is illustrated for the case of the unitary rectifier element shown in FIGURES 1 through 6 which illustrate the large current carrying capacity rectifier element described in the above noted copending application Serial No. 114,948.

Figure 1:
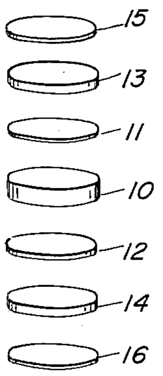
FIGURE 1 shows an exploded perspective view of a single of the wafers to be assembled in a unitary rectifier element in accordance with the present invention.

Referring to FIGURE 1, I have shown a relatively small wafer 10 of silicon material which has a P–N junction therein. The wafer can, for example, be of a diameter of $\frac{5}{32}$ inch and a thickness of .008 inch. The upper surface of the wafer 10 receives a tin wafer 11 which is alloyed thereto, while the lower surface of wafer 10 receives a tin wafer 12 which is also alloyed thereto. The alloying of the tin wafers 11 and 12 to wafer 10 may be performed in accordance with copending application Serial No. 66,458, now Patent No. 3,151,378, filed November 1, 1960, entitled "Pure Tin Alloyed Contact for Diffused Silicon Devices" in the name of George B.

Finn, Jr., and assigned to the assignee of the present invention.

Each of wafers 11 and 12 then receive wafers 13 and 14 respectively of tantalum, which again receive tin alloyed surfaces 15 and 16 on their outer surfaces.

The wafers of FIGURE 1 may be stacked in the manner shown in FIGURE 2 and then inserted in a furnace for heating to permit alloying of the various adjacent surfaces so that a unitary wafer stack is formed. Since the diameter of the wafer is small, it will be readily understood that the initial silicon wafer 10 can be easily manufactured according to presently available manufacturing techniques with a high degree of reliability. Thus there is little chance that the wafer is defective and preassembly testing of such small wafers may be relatively easily carried out.

This is to be contrasted to the use of a relatively large area wafer which could have a diameter of, for example, 0.5 inch wherein the manufacturing of such wafers entails expensive procedures and the retesting of such wafers is exceedingly difficult.

A plurality of wafers of the type shown in FIGURE 2 are formed and are thereafter assembled on a common base 17 as shown in FIGURE 3. The base 17 can, for example, be of copper or some similarly highly conductive material. If desired, the various groups of elements or wafers used for a given base can be pre-selected according to their particular characteristics to reduce current unbalance between the individual elements. The copper base 17 can, for example, be of a diameter of 1 inch and ⅛ thickness.

In the embodiment of FIGURE 3 nineteen elements are used, it being understood that either the P-type side or the N-type side of each of the wafers is placed adjacent the upper surface of base 17.

As is described in above noted copending application Serial No. 114,948, the spacing between the individual wafers is preferably no greater than their individual diameters and the thickness of the base 17 is approximately equal to the diameter of the individual wafers. Under such conditions, there will be a highly desirable thermal coupling between adjacent elements whereby the tendency of one wafer to overheat and thus carry more than its share of current to thereby become even hotter until the wafer is destroyed, will be eliminated.

That is to say, current balance between the individual wafers can be achieved by thermal coupling as contrasted to other types of current balance which require auxiliary equipment, such as balancing reactors or resistors.

Figure 4:
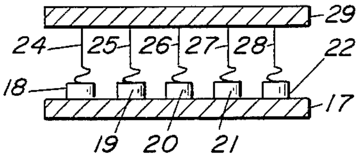
FIGURE 4 illustrates a first manner in which the upper ends of the individual wafers may be connected together.

A cross sectional view of FIGURE 3 is shown in FIGURE 4 through the wafers 18, 19, 20, 21 and 22 where a common collector 29 of conductive material is supported in some manner (not shown) with respect to base 17 and has individual leads 24, 25, 26, 27 and 28 extending to and being electrically connected to the upper surface of wafers 18 through 22 respectively. In a like manner the common collector 29 is also electrically connected to all of the individual wafers of FIGURE 3 so that they are connected in parallel between base 17 and collector 29. Preferably the individual conductors, such as conductors 24 through 28, will be longer than necessary so that mechanical stress due to movement of collector 29 with respect to base 17 will not cause a stress to be applied to the individual wafers of the assembly.

Alternative to the embodiment of FIGURE 4, the common collector could be comprised of an upper disk 29 similar to base 17 which is laid directly on top of the individual wafers carried by base 17. In this embodiment the wafers may be first placed upon the copper plate 17 and the copper plate or collector 29 may then be laid on top of this plate. The complete assembly may then be heated to cause alloying of the upper and lower tin faces of the wafers to plates 17 and 29 respectively to form the complete assembly. As then shown in FIGURE 5, an insulating tube 30 may be sealed about the space between the plates 17 and 29 to hermetically seal the interior of the unitary rectifier device.

Figure 5:
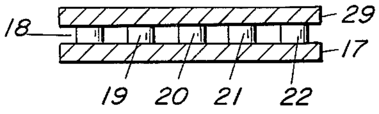
FIGURE 5 shows a modification of the common connector of FIGURE 4.
Figure 6:
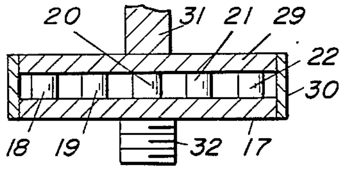
FIGURE 6 illustrates the manner in which the device of FIGURE 5 is completely assembled within a unitary device.

As is further shown in FIGURE 6, the upper plate 29 may have a flexible conductor 31 extending therefrom which could have been placed on plate 29 prior to its assembly in FIGURE 5 to serve as one terminal of the unitary rectifier element. The base 17 may then, for example, have a stud 32 extending therefrom to serve as the other terminal of the unitary device.

In FIGURE 12 I show a top view of FIGURE 3 for the case of the nineteen individual wafer elements. The wafer elements are seen to be formed of two concentric circles of wafers with a central wafer at the axis of the two concentric circles. In accordance with the present invention the diameter of the wafers may be approximately $\frac{5}{32}$ inch, the thickness of wafer 17 will be ⅛ inch, the diameter of the external concentric circle will be ¾ inch and the diameter of the inner concentric circle of wafers will be ⅜ inch. With such a construction there will be a preferred thermal coupling between the various adjacent wafers whereby the wafers of the complete assembly will be cause to operate at a common temperature so that their individual current levels will be relatively fixed and current balance between the elements is secured. In the event that a construction of the type of FIGURE 6 is utilized where there is an upper and lower plate 17 and 29, the thickness of the plate 17 is preferably ⅛ inch while the thickness of plate 29 is $\frac{1}{16}$ inch.

In the foregoing, I have described my invention only in connection wtih preferred embodiments thereof. Many variations and modifications of the principles of my invention within the scope of the description herein are obvious. Accordingly, I prefer to be bound not by the specific disclosure herein, but only by the appending claims.

I claim:

1. A semiconductor device; said semiconductor device comprising a plurality of individual wafers of silicon material having respective junctions therein, a common conductive base of mechanically and electrically receiving one side of each of said wafers, and a common conductive collector member; one side of each said plurality of individual wafers being mounted on said said common conductive base in spaced relation with respect to one another; the other side of each of said plurality of wafers being electrically connected to said common conductive collector member; said wafers being thermally coupled to one another to maintain a respective fixed temperature; each of said wafers having a surface configuration which fits within a circle having a diameter of approximately $\frac{3}{16}$ of an inch; said wafers being spaced from one another by a distance of approximately the diameter of said circle; said common conductive base having a thickness of approximately the diameter of said circle.

2. A hermetically sealed semiconductor device having a large wafer area; said hermetically sealed device including a hermetically sealed housing; and a plurality of relatively small area junction containing silicon wafers containing respective junctions therein, a conductive base and a conductive collector member contained within said hermetically sealed housing; one side of each of said wafers being electrically connected to said base, the other side of each of said wafers being electrically connected to said collector member; said one side of each of said wafers being directly mechanically mounted on said base in spaced relation from one another on said base; said wafers being thermally coupled to one another to maintain a respective fixed temperature; each of said wafers having a surface configuration which fits within a circle having a diameter of approximately $\frac{3}{16}$ of an inch; said wafers being spaced from one another by a distance of approximately the diameter of said circle;

said common conductive base having a thickness of approximately the diameter of said circle.

3. A current balancing structure for balancing the current between a plurality of parallel connected junction containing wafers of semiconductor material; said current balancing structure including thermal coupling means thermally connected to each of said wafers; said thermal coupling means being characterized in maintaining a fixed temperature distribution for each of said wafers; said thermal coupling means comprising a common heat sink for each of said wafers; each of said wafers having a surface configuration which fits within a circle having a diameter of approximately $\frac{3}{16}$ of an inch; said wafers being spaced from one another by a distance of approximately the diameter of said circle; said common conductive base having a thickness of approximately the diameter of said circle.

References Cited by the Examiner

UNITED STATES PATENTS

| | | | |
|---|---|---|---|
| 2,126,067 | 8/1938 | Walter | 317—234 |
| 2,815,472 | 12/1957 | Jackson et al. | 317—234 |
| 2,921,243 | 1/1960 | Johnson | 317—234 |
| 3,079,484 | 2/1963 | Shockley et al. | 317—235 X |

FOREIGN PATENTS

| | | |
|---|---|---|
| 595,666 | 4/1960 | Canada. |
| 1,242,208 | 8/1960 | France. |

JOHN W. HUCKERT, *Primary Examiner.*

JAMES D. KALLAM, DAVID J. GALVIN, *Examiners.*